Figure 1:
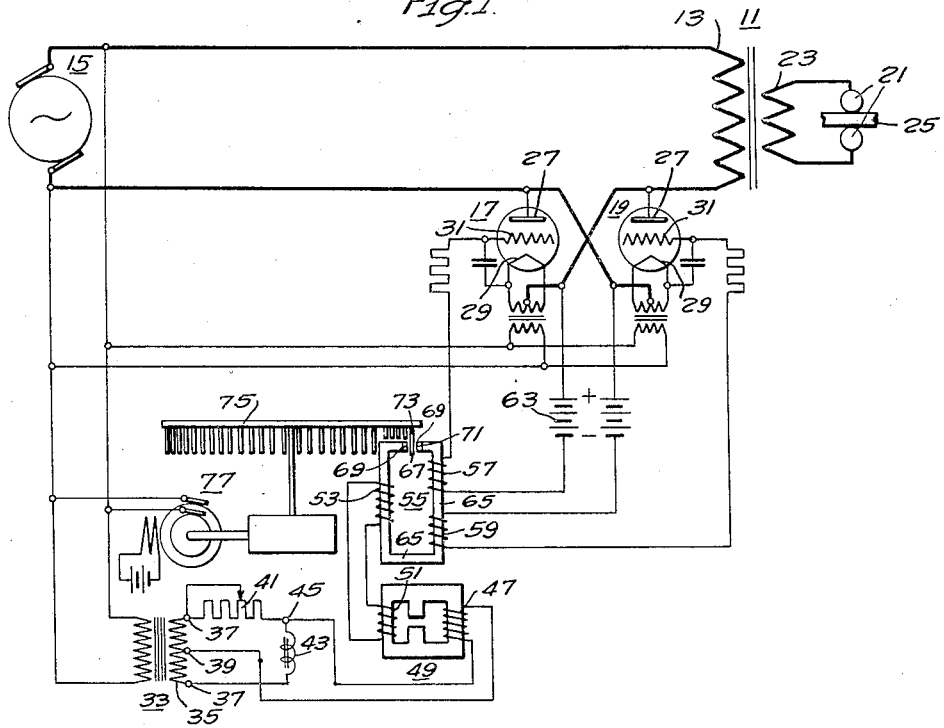

Sept. 9, 1941.    J. W. DAWSON ET AL    2,255,652
CONTROL APPARATUS
Filed Jan. 29, 1938    4 Sheets-Sheet 1

WITNESSES:
E. A. McCloskey
Hymen Diamond

INVENTORS
John W. Dawson
and Harold C. Jenks.
BY
F. W. Lyle.
ATTORNEY

Sept. 9, 1941.  J. W. DAWSON ET AL  2,255,652
CONTROL APPARATUS
Filed Jan. 29, 1938  4 Sheets-Sheet 3

WITNESSES:
E. A. McCloskey
Hymen Diamond

INVENTORS
John W. Dawson
and Harold C. Jenks.
BY
F. W. Lyle
ATTORNEY

Sept. 9, 1941.　　J. W. DAWSON ET AL　　2,255,652
CONTROL APPARATUS
Filed Jan. 29, 1938　　4 Sheets-Sheet 4

WITNESSES:

INVENTORS
John W. Dawson
and Harold C. Jenks.
BY
ATTORNEY

Patented Sept. 9, 1941

2,255,652

UNITED STATES PATENT OFFICE 2,255,652

CONTROL APPARATUS

John W. Dawson, Auburndale, Mass., and Harold C. Jenks, Wilkinsburg, Pa., assignors to Westinghouse Electric & Manufacturing Company, East Pittsburgh, Pa., a corporation of Pennsylvania Application January 29, 1938, Serial No. 187,700

14 Claims. (Cl. 250—27)

Our invention relates to electric discharge apparatus and has particular relation to control apparatus for electric discharge devices.

Electric discharge apparatus has been widely applied in resistance spot and seam welding. In a resistance welding system it is desirable that the welding current be applied intermittently in discrete pulses. The pulses of welding current are supplied for time intervals that are customarily precisely measured out in half periods of the source whereby the apparatus is energized.

To satisfy the requirements of many welding applications, particularly in the field of aeronautics, it is desirable that the imprint of the weld be very faint, or if possible, entirely absent. This object cannot be accomplished by accurately controlling the timing of the welding pulses alone but in addition requires the most precise control of the amount of heat supplied during the welding interval. To precisely determine the amount of heat, the practice is to accurately set the points in the periods of the source at which the supply of current during a welding interval commences. If the material welded is such that considerable heat is required, the supply of welding current may be initiated early in each of the welding periods. If the material does not require substantial energy, the supply of current may be initiated late in the periods of the welding interval. The just described method of controlling the amount of energy supplied to a weld is known in the art as heat control.

In accordance with the teaching of the prior art, the timing and the heat control in a welding system involves a comparatively complicated arrangement. The welding current per se is supplied through discharge apparatus to which we may here refer as main discharge devices or main discharge path. To control the timing an auxiliary discharge device is in accordance with the prior art associated with each main discharge device. For heat control purposes, a second auxiliary discharge device is associated with each main discharge device.

It is, accordingly, an object of our invention to provide electric discharge apparatus of simple structure for supplying, from a source of periodic pulsations to a load, current impulses that shall be precisely timed by the selection of a number of periods of the source and the energy output of which shall be precisely predetermined by the initiation of the supply at predetermined instants in each of the periods of the source during which the impulses flow.

Another object of our invention is to provide simple and tractable apparatus for controlling the output of an electric discharge system in such manner that it shall be capable of supplying a series of intermittent current pulses of precisely measured duration and magnitude.

An ancillary object of our invention is to provide electric discharge apparatus for controlling the supply of power to a load from a source of periodic pulsations in which the control impulses impressed on the electric discharge devices shall increase to a sufficient value to render the discharge means conductive in a time that is short compared to a period of the source but shall remain at the said energizing value for a sufficiently long time to energize the discharge means even if, when the energizing impulses are initially supplied, the potential supplied to the discharge means is not sufficient for energizaiton because of fluctuations in the load or source.

A specific object of my invention is to provide a resistance spot or seam welding system of simple structure by the operation of which it shall be possible to control with facility the timing of the welding impulses and the heat generated thereby.

According to the preferred practice of our invention, the discharge apparatus through which the load current is supplied is controlled by a system incorporating a contrivance for producing impulses of short duration compared to a period of the source of supply. The impulses are supplied in synchronism with the source, one impulse being preferably supplied for each pulsation of the source. Normally the impulses are of insufficient magnitude to render the discharge apparatus conductive. However, during the periods of the source during which the load current is to be transmitted through the discharge apparatus, the impulses are raised above the value necessary for the conductivity of the valves by suitable selective means. The number of impulses raised in magnitude is equal to the number of periods of the source during which current flows and the flow of current is thus timed in periods of the source. To control the magnitude of the current supplied, i. e., the heat supplied, the phase of the impulses relative to the waves of the source is shifted by an ordinary phase shift network.

In welding systems provided in accordance with the practice of our invention, the supply source is ordinarily of the alternating current type and the welding current is supplied through discharge devices connected in anti-parallel. A consideration of a simple system of this type will reveal that when one of the discharge devices is passing current, the potential impressed across the other discharge device is substantially equivalent to the drop across the conductive discharge device; for the arc-like discharge apparatus which is normally utilized this potential is relatively small. On the other hand it is to be noted that in accordance with the preferred practice of our invention, the impulses supplied to render discharge apparatus conductive are of short duration compared to a period or a half period of the source.

Accordingly, it may happen that an energizing impulse is supplied to one of the discharge devices while the other is still energized. Such an impulse would fail to energize the first discharge device because the potential across it is of inverse polarity and relatively small. In such a case the supply of current to the load is unbalanced and any iron in the load is saturated.

In accordance with one aspect of our invention the possibility that the situation will arise is avoided by interposing auxiliary discharge devices between the source of supply of the current impulses and the control circuits of the main discharge devices. The auxiliary discharge devices are supplied with potential directly from the source and independently of the load. Hence when an impulse is supplied to one of the auxiliary discharge devices it becomes energized and since it remains energized for a half cycle of the source, the main discharge device with which it is associated is also certain to be energized.

Figure 3:
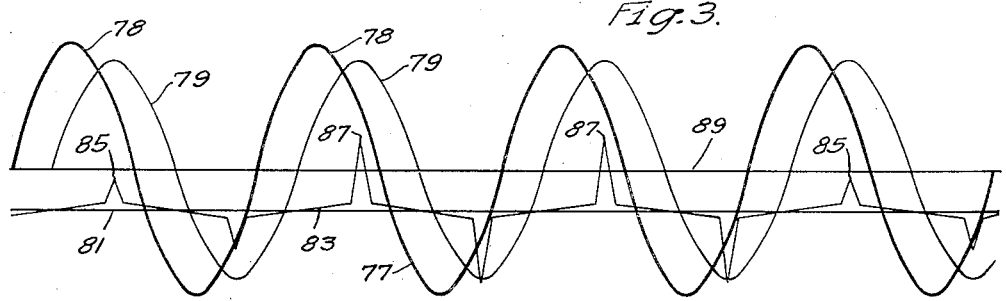
Figure 2:
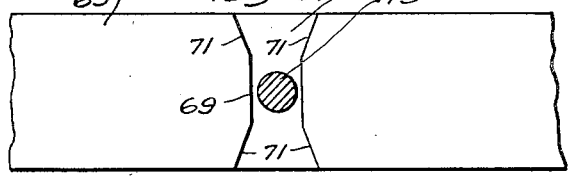
Figure 4A:
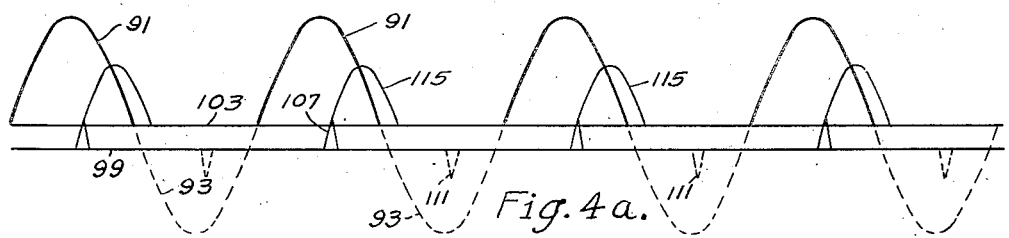
Figure 4B:
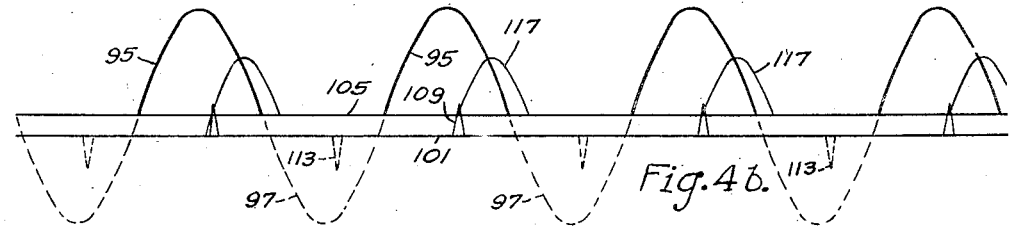
Figure 4C:
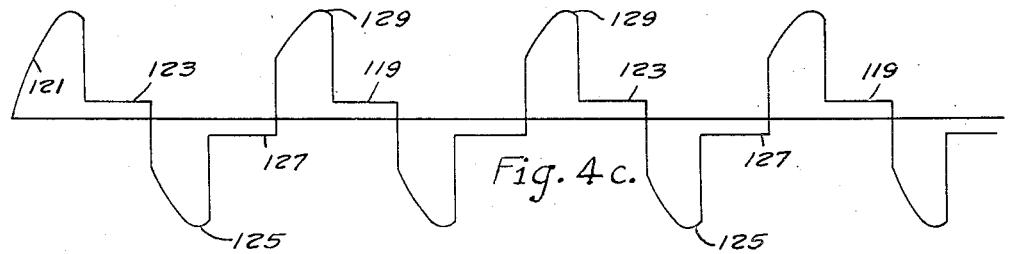
Figure 5D:
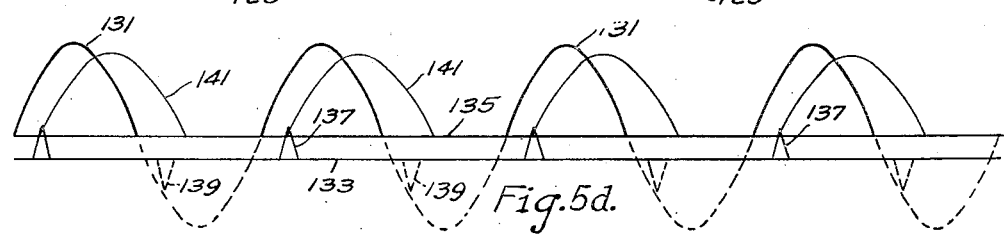
Figure 5E:
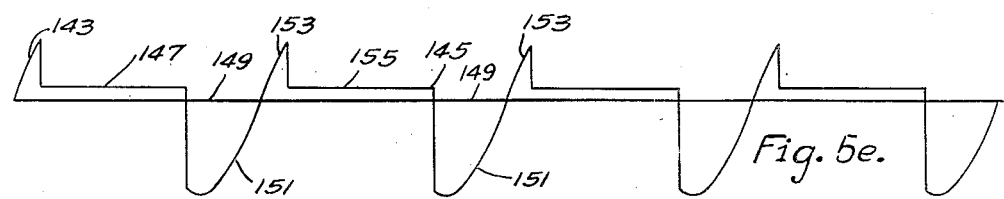
Figure 5F:
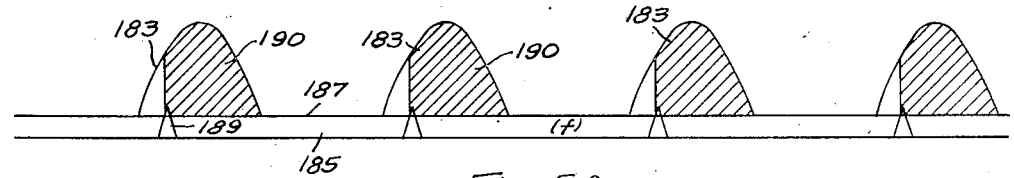
Figure 6:
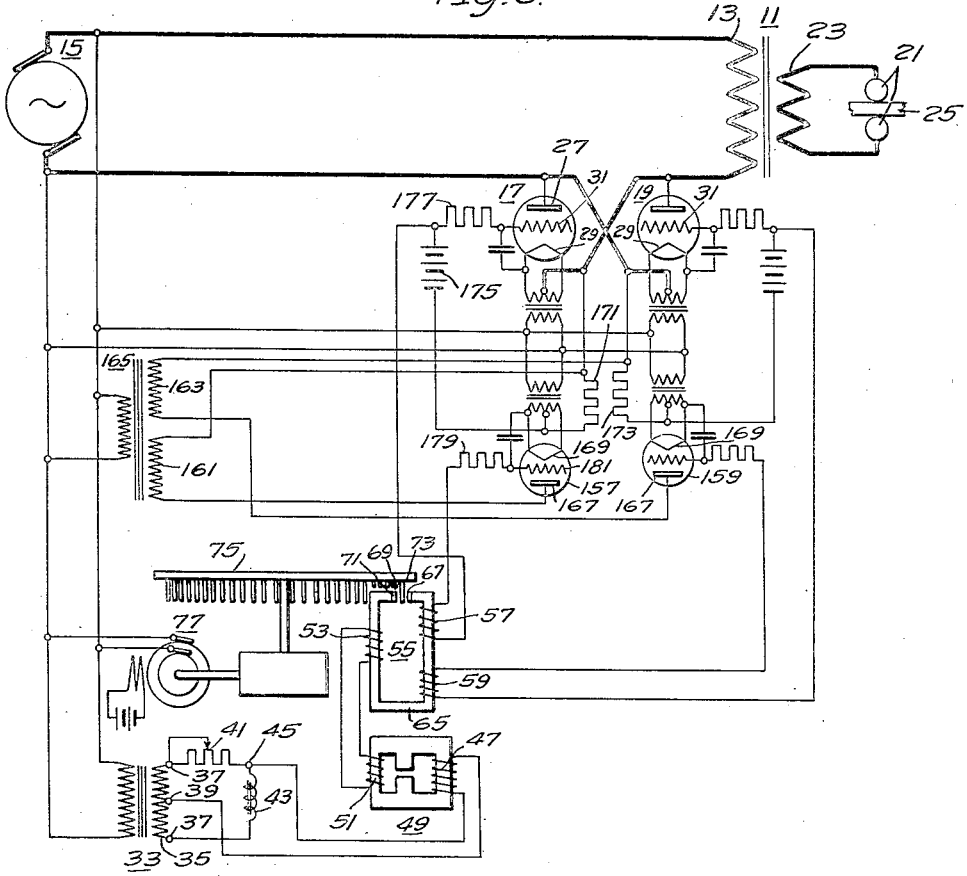
Figure 7:
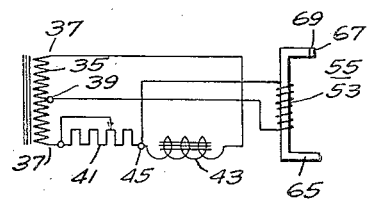
Figures 8, 9:
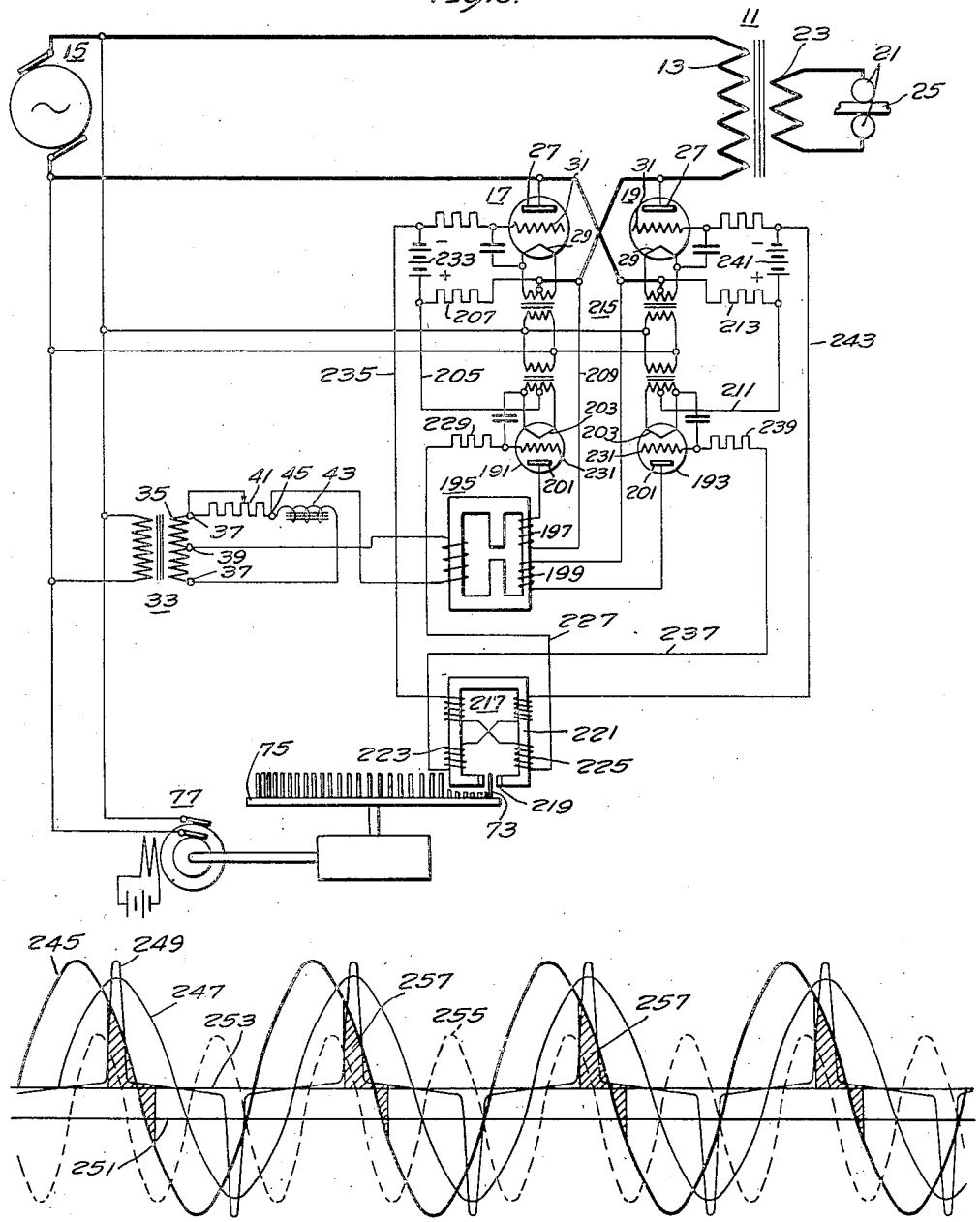

The novel features that we consider characteristic of our invention are set forth with particularity in the appended claims. The invention itself, however, both as to its organization and its method of operation together with additional objects and advantages thereof will best be understood from the following description of specific embodiments when read in connection with the accompanying drawings, in which:

Figure 1 is a diagrammatic view showing a preferred embodiment of our invention, Fig. 2 is a top plan view of an element used in the practice of our invention as shown in Fig. 1, Fig. 3 is a graph illustrating the operation of Fig. 1, Figs. 4a, 4b and 4c are a series of graphs showing the relationship of the potentials impressed in the apparatus shown in Fig. 1, Figs. 5d, 5e and 5f are a series of graphs illustrating a defect which sometimes exists in the apparatus shown in Fig. 1 and the potential relationship existing in an improvement to suppress the defects, Fig. 6 is a diagrammatic view showing the feature whereby the above mentioned defect of the Fig. 1 system is eliminated, Fig. 7 is a diagrammatic view showing a change which may be made in the apparatus shown in Figs. 1 and 6, Fig. 8 is a diagrammatic view showing a further modification of our invention, and Fig. 9 is a graph illustrating the operation of Fig. 8.

The apparatus shown in Figure 1 comprises a welding transformer 11, the primary 13 of which is supplied from a source of alternating current 15 through a pair of electric discharge paths 17 and 19 connected in anti-parallel. A pair of welding electrodes 21 are supplied from the secondary 23 of the welding transformer 11 and, in turn, provide for the transmission of current through the material 25 to be welded.

As shown, each of the discharge paths 17 and 19 is of the type having an anode 27, a hot cathode 29, a control electrode 31 and a gaseous medium. The gas is present in each discharge path at a pressure sufficient to support an arc-like discharge.

Our invention is, of course, in no way limited to the discharge devices disclosed in the drawings. For example, the hot cathode arc-like discharge devices may be replaced by mercury pool discharge devices of the keep-alive or make-alive type. For many welding applications discharge devices of the mercury-pool immersed-ignition-electrode type are utilized. In this case, discharge devices such as 17 and 19 are preferably used in the ignition circuits of the mercury pool devices as shown in Patent 2,081,987 to John W. Dawson for Electric control systems, issued June 1, 1937, and assigned to Westinghouse Electric and Manufacturing Company. Moreover, the symmetric discharge provided by the two anti-parallel connected discharge paths 17 and 19 may be obtained with a single discharge device having a pair of emissive electrodes, for example, a pair of mercury pools, with each of which a control electrode is associated. As the polarity of the source changes, one of the emissive electrodes in the latter device operates alternately as a cathode and an anode while the other operates as an anode and a cathode respectively. Hereinafter when we use the expression "in effect a pair of discharge paths" we mean thereby not only a pair of discrete discharge paths, such as is shown in Fig. 1, but also a pair of discharge paths such as would be produced by the use of two emissive electrodes in a single container, each electrode operating alternately as a cathode and an anode.

For the purpose of controlling the discharge paths 17 and 19 alternating potential is derived from the source 15 and supplied to an auxiliary transformer 33, the secondary 35 of which is provided with a pair of terminal taps 37 and an intermediate tap 39. A series network consisting of a variable resistor 41 and a reactor 43 is connected between the terminal taps 37 and a dephased potential, the phase of which is adjustable by the resistor 41, is present between the junction terminal 45 of the resistor and the reactor and the intermediate tap 39. The terminals 39 and 45 are connected to the primary 47 of a suitable impulsing transformer 49 and potential impulses of short duration compared to a half period of the source 15 having a phase position pre-set by the variable resistor 41 exist at the terminals of the secondary 51 of the transformer.

The latter potential impulses are impressed on the primary winding 53 of still another transformer 55 which is provided with a pair of secondaries 57 and 59. One of the secondaries 59 is connected between the control electrode 31 and the cathode 29 of one of the discharge paths 17 through a suitable biasing source 63 while the other secondary 57 is similarly connected between the control electrode and the cathode of the other discharge path 19. The potential impulses derived from the secondaries 57 and 61 of the transformer 57 are thus impressed in the control circuits of the main discharge paths 17 and 19. The connection of the secondaries is such that the potential impulses impressed in the control circuits of the discharge paths are of the same polarity as the corresponding anode-cathode potential so that when the anode-cathode potential of each path in its turn becomes positive impulses are impressed in their control circuits.

The transformer 57 is provided with a rectangular core 65 having at the top an air gap 67 of substantial width so that under normal circumstances the magnetic reluctance of the transformer is relatively high. The structure of the core 65 bounding the air gap 67 is shown enlarged in Fig. 2. It comprises relatively long central portions 69 from which receding portions 71 extend to both side faces of the core. The potentials peaks normally impressed in the control circuits of the discharge paths 17 and 19 are by reason of the normal high reluctance of the transformer of relatively small magnitude and are insufficient to overcome the biasing potential 63 and render the discharge paths conductive.

To time the supply of current to the welding electrodes 21, the magnetic reluctance of the transformer 55 is reduced during selected half cycles of the source. This object is accomplished by projecting in the air gap 67 of the core, pins 73 of magnetic material. The pins 73 are fastened in grooves in the periphery of a non-magnetic disc 75 rotated by a synchronous motor 77, the grooves correspond in number and position to the frequency of the source 15. In the preferred practice of our invention, a groove capable of holding a pin 73 passes over the air gap 67 during each half cycle of the source. If a pin is inserted in the groove it passes through the air gap during the same half cycle.

When the magnetic pins 73 pass through the constructed portion of the air gap 67 between the central boundaries 69 of the core, the magnetic reluctance of the transformer 55 is substantially reduced. The potential peaks impressed in the secondaries 57 and 59 of the transformer are then increased sufficiently in magnitude to render the discharge paths 17 and 19 conductive. The latter are thus rendered conductive during the number of selected half cycles in question and at the points in the half cycles corresponding to the setting of the resistor 41. By fastening pins 73 in the grooves of the disc 75 in the proper sequence and in the proper positions, any desired timing of the current supply may be attained.

The operation of the apparatus is illustrated in the graph shown in Fig. 3. In this graph time is plotted as abscissa and potential as ordinate. The heavy full line sine curve 78 is a plot of the potential impressed between the anode 27 and the cathode 29 of one of the discharge paths 17 or 19 as a function of time. The light full line sine curve 79 is a plot of the corresponding potentials present between the output taps 39 and 45 of the phase shift circuit 41, 43. The horizontal line 81 below the axis of abscissa represents the bias 63 impressed in the control circuit of the discharge path, in question. The peaked curve 83 rising from the horizontal line 81 represents the potential impressed in the control circuit of the discharge path in question from the corresponding secondary 59 or 61 of the high reluctance transformer 55. The short peaks 85 correspond to the potential produced when no pins 79 pass through the air gap 67 and the long peaks 87 correspond to the potential impressed when pins do pass through the air gap.

For the purpose of example, we may assume that the axis of abscissa 89 is the critical line for the discharge path involved. Under the circumstances, it will be seen that the discharge path represented by the graph is rendered conductive during the two central positive half cycles at instants relatively late in the corresponding half periods. Of course, the discharge path may be rendered conductive earlier in the half periods by simply properly adjusting the phase shift network 41, 43. The other discharge path may be represented by a similar set of curves with the polarity reversed. In the example given, it will be seen that the latter discharge path is rendered conductive during the half cycles succeeding each of the half cycles during which the first discharge path is energized, so that in all, four half waves of current are supplied to the material 25.

One of the difficulties involved in the apparatus disclosed in Fig. 1 arises from the fact that when one of the discharge paths, say 17, is energized, the potential across the other path 19, is equal only to the arc drop across the energized path and is of negative polarity. Under certain circumstances, it happens that the energizing potential impulse is impressed on a non-conductive discharge path during the time when the cooperative discharge device is conductive and, therefore, the non-conductive discharge device fails to become conductive when the impulse is applied. Since the impulse impressed is of short duration, the non-conductive discharge device fails to become conductive even if the plate potential later during the same half cycle assumes positive polarity as the other discharge device becomes non-conductive. At this time the positive grid impulse has disappeared and there is, therefore, no means for rendering the discharge path conductive.

This situation is illustrated in Figs. 4 and 5. In the upper graph Fig. 4a, potential is plotted as a function of time. The heavy full line half waves 91 represent the anode-cathode potential impressed on one of the discharge paths 17 or 19 during the intervals during which the anode is positive relative to the cathode. The broken heavy half waves 93 represent the corresponding anode-cathode potential when the anode is negative relative to the cathode. In the center graph (Fig. 4b the corresponding curve for the other discharge path is plotted, the full line half waves 95 again representing positive anode-cathode potential and the broken line half waves 97 negative anode-cathode potential. In each case the horizontal lines 99 and 101 directly below the axes abscissae 103 and 105 represents the biasing potential on which the energizing impulses are superimposed. The full line peaks 107 and 109 rising from the biasing potential curve 99 and 101 in each case represent energizing impulses in the control circuits of the respective discharge paths 17 and 19 which are effective in rendering the discharge paths conductive. The full line peaks 107 and 109 thus correspond to impulses impressed on each of the discharge paths while its anode-cathode potential is positive. The broken line peaks 111 and 113 represent the corresponding negative control circuit impulses which are, of course, ineffective in rendering the discharge paths conductive because they occur when the anode-cathode potential is negative. The light full line half waves 115 and 117 represent the current flow through the discharge paths in each case.

In the lowest graph, Fig. 4c, the potential across one of the discharge paths is plotted as a function of time. As will be seen from the resultant curve 119, the potential across the discharge path initially rises as a sine wave function, represented by the extreme left hand portion 121, until the discharge path is rendered and then drops abruptly to the arc drop value, represented by the horizontal line 123 adjacent the portion 121. The potential remains at this value until the discharge path is rendered non-conductive and then decreases to the negative source value, represented by the finger-shaped portion 125 projecting downward, for a short time until the other discharge path is rendered conductive. At this time the potential increases to the negative arc drop value as represented by the adjacent horizontal line 127. This is followed by a rise in the potential to the source value as represented by the upward projecting finger-shaped portion 129. As can be seen from the curve 119, the above-described variation is repeated periodically as long as the discharge paths remain conductive. The symmetry of the curve 117 shows that each discharge path 17 and 19 is in its turn rendered conductive and supplies current of one polarity or the opposite polarity through the load. The situation illustrated in Figs. 4a, 4b and 4c corresponds to proper operation of the apparatus shown in Fig. 1.

In the upper graph Fig. 5d, the heavy full line half waves 131 again represent the potential impressed across one of the discharge paths, the line 133 below the axis of abscissae 135 represents the biasing potential and the full line peaks 137 rising from this line represent the potential impulses whereby one of the discharge paths 17 or 19 is rendered conductive. The broken line peaks 139 represent the corresponding negative potential impulses and their phase position corresponds to the positive potential impulses impressed on the other discharge path 19 or 17. In the apparatus corresponding to Figs. 5d, 5e and 5f, the control impulses are impressed early in the half periods of the positive anode-cathode potential of the discharge path and, therefore, the current flows for an interval of time persisting during a substantial fraction of the subsequent half period, as is shown by the light full line half waves 141.

From the position of the broken line peaks 139, it is seen that current flow through the conductive discharge path 17 or 19 is still continuing when the negative potential impulse occurs and, therefore, when the positive potential impulse occurs for the other originally non-conductive discharge path. Since at this time the potential impressed across the latter is equal only to the negative arc drop potential across the conductive discharge path, the former will fail to become conductive when the impulses are impressed.

The potential impressed across the originally conductive discharge path is plotted as a function of time in the central graph Fig. 5e. As can be seen from the extreme left-hand portion 143 of the curve 145 in the graph, the potential across the discharge path corresponds to the source potential until the discharge path becomes conductive and then it drops to the arc-drop value as represented by the first horizontal line 147 above the abscissae axis 149 on the left. This condition continues until the discharge path is rendered non-conductive. At this time the potential decrease to the source value which is negative, as represented by the downwardly projecting loop 151 in the curve, and since the control impulse occurred while the first conductive discharge path was conducting and the other discharge path was not rendered conductive, continues at the source value until the same discharge path is again rendered conductive. This situation is represented by the short sine wave portion 153 extending above the axis 149 which quickly drops to the horizontal line 155 representing the arc drop value. The operation represented in graph, Fig. 5e, continues as long as current is conducted through the load. Its most undesirable feature is unbalanced current flow through the load and possible saturation of the welding transformer 11.

A remedy for the condition is provided in the apparatus shown in Fig. 6. The latter system incorporates all of the elements of the apparatus shown in Fig. 1. However, in addition, an auxiliary discharge device of the arc-like discharge type 157 and 159 is associated with each main discharge path 17 and 19. Each of the auxiliary discharge devices 157 and 159 is energized directly from the source 15, independently of the load 11, through the secondaries 161 and 163 respectively, of a separate transformer 165. The energizing circuit for the left-hand discharge device 157 extends from the lower terminal of the lower secondary 161 of the transformer through the anode 167, the cathode 169, a resistor 171 to the upper terminal of the secondary. The other discharge device 159 is correspondingly connected to the upper secondary 163 of the transformer through a resistor 173. The resistors 171 and 173 are each connected in the control circuit of the corresponding discharge path 17 or 19 and control potential is thus impressed in the control circuits in dependence upon the current flow through the resistor.

The circuit for the left-hand resistor 171 extends from the lower terminal of the resistor through a biasing battery 175, the grid resistor 177 of the main discharge path 17 to the control electrode 31 of the path, the cathode 29 of the same main discharge path to the upper terminal of the resistor 171. The other resistor 173 is similarly connected. The connection of the secondaries 161 and 163 of the transformer 165 and the resistor is such that when the auxiliary discharge devices 157 and 159 are energized, the control electrode 31 of each of the main discharge paths 17 and 19 is of sufficient positive polarity relative to its cathode to render the discharge path conductive if at the time that the anode cathode potential of the discharge path is sufficiently positive.

The secondaries of the high reluctance transformer 57 are now connected in the control circuit of the auxiliary discharge devices 157 and 159 instead of being connected in the control circuits of the main discharge paths 17 and 19 as in Fig. 1. The circuit for the upper secondary 57 extends from the upper terminal of the secondary, through the grid resistor 179 of the left-hand auxiliary discharge device 157 to the control electrode 181 of the device, the cathode 169 of the device, the biasing battery 175, which also functions for the auxiliary discharge device, to the lower terminal of the secondary 57. The other secondary of the high reluctance transformer is similarly connected.

When the energizing impulses are now impressed by the secondaries 57 and 59 in the control circuits of the auxiliary discharge devices 157 and 159, the latter devices become conductive, regardless of when the impulses are impressed since their anode-cathode potential is derived from the main source through independent secondaries 161 and 163 of the transformer 165. By reason of this connection, the potential across a non-conductive device 157 or 159 is a source potential even if the other happens to be conductive. Since the discharge devices 157 and 159 when once rendered conductive remain so, they with certainty cause the corresponding discharge paths to become conductive regardless of whether or not the original energizing impulse occurred while the anode-cathode potential impressed across corresponding main discharge paths 17 or 19 was sufficiently high for conductivity.

This is illustrated in the lower graph Fig. 5f in which potential is plotted vertically and time horizontally. The full line half waves 183 represent the potential impressed between the anode 167 and the cathode 169 of the auxiliary discharge device 157 or 159 which corresponds to the discharge path 17 or 19 that has positive potential impressed thereon when loops 151 of graph, Fig. 5f, occur; i. e., the main discharge path then fails to become conductive in the Fig. 1 arrangement. The horizontal line 185 below the axis of abscissa 187 represents the biasing potential impressed in the control circiut of the auxiliary device. The full line peaks 189 represent the potential impulses impressed in the control circuit of the auxiliary device. The critical control potential is assumed to be zero. As will be seen, each of the auxiliary discharge devices is in its turn rendered conductive when the impulse occurs and remains conductive during the remaining portion of the half cycle as shown by the shaded areas 190 under the half waves 183. Since the auxiliary discharge devices are conductive during a considerable portion of the half cycles, energizing potential is supplied in the control circuit of the corresponding main discharge paths through the corresponding resistors 171 and 173 during these intervals and the latter are rendered conductive when the potential across them rises to the proper value even if it is not initially at this value.

Under certain circumstances, the invention shown in Figs. 1 and 6 may be modified by the omission of the impulse transformer 49. In such a case the output terminals 39 and 45 of the phase shift network 41, 43 are connected directly to the primary 57 of the high reluctance transformer 55 as shown in Fig. 7.

In the apparatus shown in Fig. 8, auxiliary discharge devices 191 and 193 are associated with the main discharge paths 17 and 19, respectively. Anode potential is supplied to the auxiliary discharge devices 191 and 193 directly from an impulse transformer 195 which is energized in the same manner as the transformer 49 in the other modifications, through the phase shift network 41, 43. The impulse transformer 195, however, is provided with a pair of secondaries 197 and 199, one 197 being associated with one of the auxiliary devices 191 and the other 199 with the other device 193. Potential is supplied between the anode 201 and the cathode 203 of the left-hand auxiliary device 191 in a circuit extending from the upper terminal of the upper secondary 197 of the impulse transformer to the anode 201, the cathode 203, a conductor 205, a resistor 207, a conductor 209, to the lower terminal of the secondary. Potential is supplied to the right-hand auxiliary device 193 from the lower terminal of the lower secondary 199 to the anode 201, the cathode 203, a conductor 211, a resistor 213, a conductor 215 to the upper terminal of the secondary. The potentials supplied to the anode circuits of the auxiliary devices 191 and 193 are of short duration compared to a half cycle of the source and their phase position is dependent on the setting of the phase shift network 41, 43 which may be adjusted at will.

Control potential is supplied to the auxiliary discharge devices 191 and 193 from a magnetic impulsing device 217 which has somewhat the same appearance and operation as the high reluctance transformer 55 in the other modifications. As in the other modifications, the pulses are produced by magnetic pins 73 selectively mounted in the disc 75 which is rotated by a synchronous motor. The pins pass through an air gap 219 in a rectangular magnetic core 221 and produce pulses of substantial amplitude in windings 223 and 225 mounted on the core. The pins may be inserted in the openings in such manner that the desired half cycles of the source are selected as in the other modifications.

The output coils 223 and 225 of the pulse producing device 217 are connected each in a control circuit of one of the auxiliary devices 191 and 193. One of the circuits extends from the lower terminal of one of the coils 225 through a conductor 227, a grid resistor 229 to the control electrode 231 of the left-hand auxiliary device 191, the cathode 203, the conductor 205, a biasing source 233, a conductor 235 to the upper terminal of the coil 225. The other circuit extends from the lower terminal of the other coil 223 through a conductor 237, the grid resistor 239 associated with the other auxiliary device, the control electrode 231, the cathode 203, the conductor 211, a biasing source 241, a conductor 243 to the upper terminal of the coil.

When pins 73 pass through the gap 219, pulses are thus produced in the control circuits of the auxiliary devices 191 and 193. The phase of the pulses are such that their polarity is positive when positive impulses produced through the impulse transformer 195 occur. Accordingly, each auxiliary discharge device 191 and 193 is in its turn rendered conductive if the corresponding magnetic pins 73 happen to be inserted in the disc 75.

When an auxiliary discharge device 191 or 193 is thus rendered conductive, current is transmitted through the resistor 207 or 213 in series therewith and a potential is impressed between the control electrode 31 and the cathode 29 of the corresponding main discharge path 17 or 19 which causes the main discharge path to become conductive. Of course, the phase position of the energizing impulses transmitted through the resistors 207 and 213 is such as to correspond to positive anode cathode potential of the main discharge paths.

The operation of the apparatus is illustrated in Fig. 9. In this view, potential is plotted as ordinate and time as abscissa. The heavy full line sine curve 245 represents the potential supplied by the source between the anode 27 and the cathode 29 of one of the main discharge paths 17 or 19 when the load current is zero. The light full line sine curve 247 represents the phase shifted potential supplied between the output terminals 39 and 45 of the phase shift network 41, 43. The full line peaked curve 249 represents the output potential supplied by one of the secondaries 197 or 199 of the impulse transformer 197 in the anode circuit of one of the auxiliary discharge devices 191 or 193. The horizontal line 251 below the axis of abscissa 253 corresponds to the biasing potential impressed by the battery 233 in the control circuit on the auxiliary discharge device. The broken line curve 255 represents the potential pulses supplied by the pulse producing device 217. The pulses are superimposed on the bias potential and therefore the curve 255 is built up on the line 251.

When a positive pulse is supplied by the coils 223 or 225 at the same time that a positive impulse is impressed by the secondary 197 or 199, the corresponding auxiliary device 191 or 193 is rendered conductive and in turn the corresponding main discharge path 17 or 19 is rendered conductive. This is illustrated by the shaded areas 257 under the positive half waves of the curve 245 in the region where the peaks 249 and positive half waves of curve 255 exist together. A similar curve would represent the situation for the other main discharge path with the only difference that the waves would be inverted so that shaded areas such as 257 are present between the shaded areas shown in Fig. 9.

It is to be noted that the core 221 is composed of somewhat different material than the core 65. The latter is composed of magnetizable material such as is used for the laminations of an ordinary transformer. The former is composed of permanently magnetized material since in this case there must be lines of flux which the pins 73 cut to produce impulses in the windings 223 and 225. The pins 73 are composed of magnetizable material in both cases.

It is to be noted further that while the auxiliary discharge devices in the system disclosed in the Dawson patent 2,081,987 supply substantial ignition current and are therefore relatively large and expensive to maintain and operate, the auxiliary discharge devices 191 and 193 and 157 and 159 in the arrangements disclosed herein supply only the current necessary in the control circuits of the main discharge paths 17 and 19 respectively, and are therefore relatively small and inexpensive to maintain and operate.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. Apparatus for supplying a load from a source of periodic potential pulsations comprising valve means interposed between said source and said load, said valve means being of the type that is normally non-conductive but becomes conductive when an impulse of magnitude greater than a predetermined magnitude is impressed thereon, means for producing a plurality of impulses of magnitude less than said predetermined magnitude and of short duration compared to a period of said pulsations, means for impressing said impulses on said valve means, and means cooperative with said producing means for increasing the magnitude of certain of said impulses to a value greater than said predetermined magnitude while retaining their wave form thereby correspondingly to render said valve means conductive.

2. Apparatus for supplying a load from a source of periodic potential pulsations comprising valve means interposed between said source and said load, said valve means being of the type that is normally non-conductive but becomes conductive when an impulse of magnitude greater than a predetermined magnitude is impressed thereon, means for producing a plurality of impulses of magnitude less than said predetermined magnitude in synchronism with said source, one impulse being produced for each pulsation of said source and said impulses being of short duration compared to a period of said pulsations, means for impressing said impulses on said valve means, and means cooperative with said producing means for increasing the magnitude of certain of said impulses to a value greater than said predetermined magnitude while retaining their wave form thereby correspondingly to render said valve means conductive.

3. Apparatus for supplying a load from a source of periodic potential pulsations comprising valve means interposed between said source and said load, said valve means being of the type that is normally non-conductive but becomes conductive when an impulse of magnitude greater than a predetermined magnitude is impressed thereon, means for producing a plurality of impulses of magnitude less than said predetermined magnitude, said producing means including a magnetic reluctance inserted in the path through which said impulses are transmitted for maintaining this magnitude smaller than said predetermined magnitude, means for impressing said impulses on said valve means and means for decreasing said magnetic reluctance to increase the magnitude of certain of said impulses to a value greater than said predetermined magnitude, thereby correspondingly to render said valve means conductive.

4. Apparatus for supplying a load from a source of periodic potential pulsations comprising valve means interposed between said source and said load, said valve means being of the type that is normally non-conductive but becomes conductive when an impulse of magnitude greater than a predetermined magnitude is impressed thereon, means for producing a plurality of impulses of magnitude less than said predetermined magnitude, said producing means including a transformer from the secondary of which the impulses are derived and the magnetic reluctance of which is normally so large that the magnitude of the impulses derived from said secondary are maintained smaller than said predetermined magnitude, means for impressing said impulses on said valve means and means for decreasing said magnetic reluctance of said transformer to increase the magnitude of certain of said impulses to a value greater than said predetermined magnitude, thereby correspondingly to render said valve means conductive.

5. Apparatus for supplying a load from a source of periodic pulsations comprising valve means interposed between said source and said load, means for controlling the conductivity of said valve means, said controlling means requiring the simultaneous application of at least two potentials to render said valve means conductive, means for supplying one of said potentials continuously in the form of pulses in synchronism with said source said supplying means including means for converting the applied pulses to a wave form of short duration compared to a period of said source and means for applying said other potential in the form of pulses only during selected pulsations of said source but in synchronism with said source.

6. Apparatus for supplying a load from a source of periodic pulsations comprising valve means interposed between said source and said load, means for controlling the conductivity of said valve means, said controlling means requiring the simultaneous application of at least two potentials to render said valve means conductive, means for supplying one of said potentials continuously in the form of pulses of short duration compared to a half period of said source in synchronism with said source, means for applying said other potential in the form of pulses only during selected pulsations of said source but in synchronism with said source and means for shifting the phase of one set of said pulses relative to the pulsations of said source.

7. Apparatus for supplying a load from a source of periodic pulsations comprising in effect a pair of electric discharge paths each terminating in principal electrodes interposed between said source and said load in such manner that when one of said paths is conductive the potential between the principal electrodes of the other is substantially reduced, a control circuit for each of said discharge paths and means for impressing on said control circuits potentials for energizing said discharge paths, said potential impressing means comprising means for producing potentials of short duration compared to a period of said pulsations to initiate the impressing of said control circuit potential and means for extending the effect of said potential of short duration so that it persists for an interval of time sufficiently long to energize a discharge path during a pulsation even if when the energizing potential is first applied the other discharge path is conductive and the potential of said first-mentioned discharge path is substantially reduced.

8. Apparatus for supplying a load from a source of periodic pulsations comprising in effect a pair of electric discharge paths each terminating in principal electrodes interposed between said source and said load in such manner that when one of said paths is conductive the potential between the principal electrodes of the other is substantially reduced, a control circuit for each of said discharge paths and means for impressing, in said control circuits during alternate pulsations, potentials for energizing said discharge paths, said potential impressing means comprising means for producing potentials of short duration compared to a period of said pulsations to initiate the impressing of said control circuit potential and means for extending the effect of said potential of short duration so that it persists for an interval of time sufficiently long to render the discharge path conductive even if when the energizing potential is first applied the other discharge path is energized and the potential of said first mentioned discharge path is substantially reduced.

9. Apparatus for supplying a load from a source of alternating current comprising in effect a pair of discharge paths terminating in principal electrodes connected in anti-parallel, a control electrode associated with each said path, a transformer normally having high reluctance and including a primary and a plurality of secondaries, means for connecting one of said secondaries between a control electrode and a principal electrode of one of said paths, means for connecting another of said secondaries between a control electrode and a principal electrode of another of said paths, means for supplying a potential to said primary and means for reducing the reluctance of said transformer during selected half cycles of said source.

10. Apparatus for supplying a load from a source of periodic pulsations comprising in effect a pair of electric discharge paths each terminating in principal electrodes interposed between said source and said load in such manner that when one of said paths is conductive the potential between the principal electrodes of the other is substantially reduced, a control circuit for each of said discharge paths and means for impressing in said control circuits potentials for rendering said discharge paths conductive, said impressing means comprising means for producing electrical impulses of duration that is short compared to a period of said pulsations, auxiliary gaseous electric discharge means supplied with potential from said source independently of said load, means for impressing said impulses on said discharge means to render said discharge means conductive and means for impressing the output of said gaseous discharge means in the control circuits of said discharge paths.

11. Apparatus for supplying a load from a source of periodic pulsations comprising in effect a pair of electric discharge paths each terminating in principal electrodes interposed between said source and said load in such manner that when one of said paths is conductive the potential between the principal electrodes of the other is substantially reduced, a control circuit for each of said discharge paths and means for impressing in said control circuits potentials for rendering said discharge paths conductive, said impressing means comprising means for producing electrical impulses of duration that are short compared to a period of said pulsations, auxiliary gaseous electric discharge means supplied with potential from said source independently of said load, means for impressing said impulses on said discharge means, means for increasing the amplitude of said impulses during certain selected periods of said source to a value sufficient to render said discharge means conductive and means for impressing the output of said gaseous discharge means in the control circuits of said discharge paths.

12. Apparatus for supplying a load from a source of alternating current comprising a plurality of arc-like electric discharge paths each having in effect an anode, a cathode and a control electrode connected in anti-parallel between said source and said load, and means for successively impressing impulses between the control electrode and the cathode of each one of the discharge paths to control the conductivity of each path in its turn, said impressing means comprising means for producing electrical impulses of short duration compared to a period of said source in synchronism with said source, an auxiliary electric discharge device having a plurality of principal electrodes and a control electrode associated with each said discharge path, means for impressing potentials between the principal electrodes of each said discharge path directly from said source and independently of said load and means for impressing said impulses between the control electrode and a principal electrode of each said discharge device.

13. In combination, a transformer consisting of coil means and a high reluctance core having an air gap therein, an array of elements capable of being disposed in said gap and when so disposed reducing the reluctance of said core and means for moving said elements successively into said gap.

14. In combination, a transformer consisting of coil means and a high reluctance core having an air gap therein, an array of elements capable of being disposed in said gap and when so disposed reducing the reluctance of said core, means for supplying a periodically pulsating current to said coil means and means for moving said elements in synchronism with said current successively into said gap.

JOHN W. DAWSON.
HAROLD C. JENKS.